United States Patent Office 3,146,180
Patented Aug. 25, 1964

3,146,180
SUBSTITUTED OXETANES
Harry J. Cenci, Warminster, Pa., assignor to Rohm & Haas Company, Philadelphia, Pa., a corporation of Delaware
No Drawing. Filed Apr. 4, 1961, Ser. No. 100,523
8 Claims. (Cl. 204—162)

This invention deals with a method for making specific substituted oxetanes.

The oxetanes of the present invention may be represented by the formula

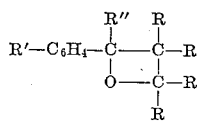

in which R stands for hydrogen or alkyl groups, R' stands for hydrogen, halogen or alkyl groups, and R" stands for hydrogen, aryl, halogenaed aryls or alkylated aryls. The total of carbon atoms in all of the R groups should range from 5 to 18. Typical embodiments of R include hydrogen and methyl, ethyl, isopropyl, tert-butyl, hexyl, tert-octyl, decyl, dodecyl, hexadecyl, and octadecyl groups.

The products of the present invention are prepared by irradiating a mixture of

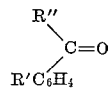

and an alkene compound having the formula

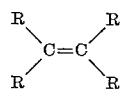

in which the R groups have the significance set forth previously. Within any one alkene reactant, at least one of the R groups must be alkyl and preferably at least one R group on each of the carbon atoms to which it is attached should be an alkyl group. It is preferred to have from 5 to 18 carbon atoms in the alkene reactant with the total possible range being from about 5 to 20. Alkenes having fewer carbon atoms than 5 are difficult to react and results are not entirely satisfactory. Appreciably above 20 carbon atoms, the alkenes are sluggish and desired results approach the minimum.

When unsymmetrical alkenes are used in the reaction, an isomeric mixture of oxetanes may result depending on which way the alkene adds across the carbonyl group. Isomeric mixtures of alkenes which are commercially available, such as diisobutylene, which is principally a mixture of 2,4,4-trimethylpentene-1 and 2,4,4-trimethylpentene-2, may also be used in this reaction. Both isomers react and complex isomeric mixtures of oxetanes result.

Typical alkene reactants include 2-methylbutene-2, hexene-2, hexene-3, cyclohexene, heptene-3, octene-2, 2,4,4-trimethylpentene-1, 2,4,4-trimethylpentene-2, decene-4, dodecene-3, tetradecene-5, hexadecene-2, hexadecene-5, octadecene-6, 2,3-dimethylbutene-2, 3,4-dimethylhexene-3, 4-methyl-5-ethyloctene-4, 3-methyloctene-3, 3-ethyloctene-3, 4,5 - diethylheptene-3, 5 - methyl - 6 - ethylnonene-5, 4-methylnonene-4, 4-ethyldecene-4, 4,5-diethyldecene-4, 4-methyl-5-propylundecene-4, 4,5-dipropyldodecene-4, 4-methyl-5-butylpentadecene-4, 3,4-diethylhexadecene-3, and 5-methyloctadecene-5.

The carbonyl reactant should be soluble in, or miscible with, the alkene reactant. In other words, it is preferable to have a homogenous reaction system in order to achieve the maximum benefits of the present invention.

It is also preferable to have a concentrated reaction system so that the reactants are in intimate proximity. Accordingly, the olefin reactant may be used in excess in order to achieve maximum yields, but the use of an extraneous solvent is undesirable.

The present reaction is consummated under irradiation in the range of 3300 to 4500 Angstrom units, preferably 3400 to 4000 Angstrom units. This range may be achieved by the use of a black light or a Woods light. Typically, a commercial embodiment is the Hanovia CH–4 spot focus arc bulb.

The reaction is conducted in the temperature range between the freezing point and the boiling point of the reaction system. This will generally be determined by the particular reactants employed. Typically, the reaction may be conducted in the range of about 0° to about 150° C. and may be preferably conducted in the range of about 20° to 100° C.

The products of the present invention are useful as stabilizers and plasticizers for polyvinyl chloride. They also have post-emergence herbicidal activity, especially against duckweed when applied and evaulated according to standard techniques.

The method of the present invention is characterized by good yields of desired products and minimization of undesired side reaction. The reaction is readily controlled and reaction times are appreciably less than those of the prior art methods.

The compounds of the present invention, as well as the method for making them, may be more fully understood from the following examples which are offered by way of illustration and not by way of limitation. Parts by weight are used throughout.

Example 1

A mixture of 449 parts (4.0 moles) of redistilled diisobutylene and 106 parts (1.0 mole) of freshly distilled benzaldehyde in a nitrogen atmosphere in a flask made of Vycor 7910 glass is irradiated with a 100 watt Hanovia spot focus black light. Samples are removed from the reaction mixture periodically and scanned in the infrared in order to follow the course of the reaction. After four days of continuous irradiation, the reaction is stopped. The colorless reaction mixture which weighs 542 parts (555 parts charged) is distilled through a 12 inch Vigreux column at reduced pressure to remove the excess diisobutylene and 21 parts of unreacted benzaldehyde. The main fraction, weighing 105 parts, distills as a colorless liquid at 78° to 102° C. at 0.35 to 0.75 mm. absolute pressure (mostly at 86° to 88° C. at 35 to 0.40 mm. absolute pressure); $n_D^{26.5}$ 1.5015. This represents a 63% yield of the substituted oxetanes.

The product contains 82.31% carbon (theoretical 82.51%) and 10.07% hydrogen (theoretical 10.16%). The product is identified as 4-tert-butyl-3,3-dimethyl-2-phenyl oxetane, and isomeric oxetanes. The infrared spectrum of the product contains the characteristic oxetane band at 10.08 microns.

Example 2

When the same reaction mixture as in Example 1 in a Pyrex flask is irradiated with the same light as in Example 1 for 5 days, the yield of substituted oxetanes is 64%.

Example 3

The same equipment as in Example 1 is charged with 182 parts (1.0 mole) of benzophenone and 449 parts (4.0 moles) of redistilled diisobutylene. The stirred reaction mixture is irradiated with a 100 watt Hanovia black light for one week. The reaction mixture is filtered to give 12.8 parts of benzpinacol (7%) as a while crystalline precipitate, M.P. 173° to 183° C. The product contains 85.04% carbon (theoretical 85.21%) and 5.98% hydrogen (theoretical 6.05%).

The filtrate is distilled through a 6-inch packed column to remove the excess diisobutylene and 72 parts of unreacted benzophenone. The main fraction, weighing 151.1 parts, distills as a pale yellow viscous liquid at 121° to 156° C. at 0.05 to 0.40 mm. absolute pressure (mostly at 142° to 146° C. at 0.05 mm. absolute pressure). This represents a 90% yield of the substituted oxetanes. A redistillation of the main cut gives a viscous liquid, boiling point 127° to 131° C. at 0.05 mm. absolute pressure; $n_D^{25}$ 1.5500.

The product contains 85.60% carbon (theoretical 85.66%) and 8.70% hydrogen (theoretical 8.90%). The product is identified as 2,2-diphenyl-4-neopentyl-3-methyl oxetane and other isomeric oxetanes. Also, from this distillation, there is isolated a small amount of a white crystalline solid, M.P. 90° to 102° C., whose infrared spectrum contains the typical oxetane band at 10.25 microns. The wide melting point range is due to the presence of more than one oxetane isomer.

*Example 4*

The same equipment as in Example 1 is charged with 359 parts (3.2 moles) of diisobutylene and 201 parts (0.80 mole) of 2,4'-dichlorobenzophenone. The reaction mixture is stirred and irradiated with a 100 watt Hanovia spot focus black light. Samples are removed periodically and their infrared spectra are obtained. The course of the reaction could be followed by the appearance of the oxetane band at 10.21 microns coupled with the disappearance of the carbonyl band at 5.99 microns. After 19 days of irradiation, the reaction is stopped. The excess diisobutylene is distilled off to leave 281 parts of a brown viscous liquid. The infrared spectrum of this material indicates that it still contains some 2,4'-dichlorobenzophenone in addition to the desired oxetanes. A portion (265 parts) of the above liquid is distilled through a 6-inch Vigreux column to give as the main cut 190 parts of a yellow, very viscous liquid, boiling point 153° C. at 0.15 mm. absolute pressure —179° C. at 0.28 mm. absolute pressure. From this cut, a crystalline oxetane is isolated which, after recrystallization from methanol, has a M.P. 108° to 110° C. The product contains 69.69% carbon (theoretical 69.42%), 6.46% hydrogen (theoretical 6.66%), and 19.40% chlorine (theoretical 19.52%). The product is identified as 4-tert-butyl-3,3-dimethyl-2-(2-chlorophenyl)-2-(4-chlorophenyl) oxetane and other isomeric oxetanes.

*Example 5*

The same equipment as in Example 1 is charged with 411 parts (5.0 moles) of redistilled cylohexene and 122 parts (1.15 moles) of freshly distilled benzaldehyde. The stirred reaction mixture is irradiated with a 100 watt Hanovia black light for one week. The reaction mixture is then distilled through a 12-inch Vigreux column to remove the excess cyclohexene and the unreacted benzaldehyde. Several cuts are obtained with a center cut weighing 68.5 parts (32%) distilling at 84° to 86° C. at 0.15 mm. absolute pressure; $n_D^{27.5}$ 1.5388. The product contains 81.96% carbon (theoretical 82.93%) and 8.63% hydrogen (theoretical 8.57%). The product is identified as 8-phenyl-7-oxabicyclo-[4.2.0]octane. The infrared spectrum contains the characteristic oxetane band at 10.20 microns. The yield is 55%.

*Example 6*

Into the same equipment as in Example 1, there is charged 505 parts (2.0 moles) of octadecylene and 60 parts (0.50 mole) of freshly distilled p-methylbenzaldehyde. The stirred reaction mixture is irradiated with a 100 watt Hanovia spot focus black light. Samples are removed periodically and scanned in the infrared region to follow the course of the reaction. After six days of continuous irradiation, the reaction is stopped. The excess olefin and the unreacted p-methylbenzaldehyde are distilled off at reduced pressure to leave a residue of 166 parts as a yellow viscous oil. Infrared analysis indicates that this is essentially the desired oxetane.

I claim:

1. A method for the preparation of the compound having the formula

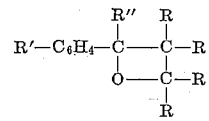

which comprises irradiating in the range of 3300 to 4500 Angstrom units, the reactants

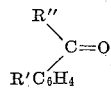

and

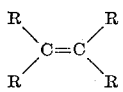

in the temperature range of about 0° to 150° C. and between the freezing and boiling points of the reaction system, in which R is a member of the group consisting of hydrogen and alkyl groups, R' is a member from the group consisting of hydrogen, fluorine, chlorine, bromine, and lower alkyl groups, and R" is a member from the group consisting of hydrogen, phenyl, fluorinated phenyl, chlorinated phenyl, brominated phenyl, and alkylated phenyl groups in which the total of carbon atoms in the alkene reactant is in the range of about 5 to 20.

2. The method according to claim 1 in which the reaction temperature of about 20° to 100° C. is employed and in which the reaction system is homogenous.

3. The method according to claim 2 in which the irradiation is in the range of about 3400 to 4000 Angstrom units.

4. The method according to claim 2 in which the olefinic reactant is used in excess.

5. The method for preparing oxetanes having the empirical structure, $C_{15}H_{22}O$, which comprises irradiating in the range of 3300 to 4500 Angstrom units, in the temperature range of about 0° to 150° C., benzaldehyde and diisobutylene.

6. The method for preparing oxetanes having the empirical structure, $C_{21}H_{26}O$, which comprises irradiating in the range of 3300 to 4500 Angstrom units, in the temperature range of about 0° to 150° C., benzophenone and diisobutylene.

7. The method for preparing oxetanes having the empirical structure, $C_{21}H_{24}OCl_2$, which comprises irradiating in the range of 3300 to 4500 Angstrom units, in the temperature range of about 0° to 150° C., 2,4'-dichlorobenzophenone and diisobutylene.

8. The method for preparing oxetanes having the empirical structure, $C_{13}H_{18}O$, which comprises irradiating in the range of 3300 to 4500 Angstrom units, in the temperature range of about 0° to 150° C., cyclohexene and benzaldehyde.

References Cited in the file of this patent

UNITED STATES PATENTS

| | | |
|---|---|---|
| 2,600,054 | Hackmann | June 10, 1952 |
| 2,650,253 | Rust et al. | Aug. 25, 1953 |
| 2,995,572 | Harris | Aug. 8, 1961 |